(12) United States Patent
Seki

(10) Patent No.: US 11,066,867 B2
(45) Date of Patent: Jul. 20, 2021

(54) DOOR CONTROL DEVICE

(71) Applicant: SUBARU CORPORATION, Tokyo (JP)

(72) Inventor: Junya Seki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 135 days.

(21) Appl. No.: 16/150,890

(22) Filed: Oct. 3, 2018

(65) Prior Publication Data

US 2019/0106926 A1 Apr. 11, 2019

(30) Foreign Application Priority Data

Oct. 6, 2017 (JP) .............................. JP2017-196001

(51) Int. Cl.
| | | |
|---|---|---|
| *E05F 15/75* | (2015.01) | |
| *E05F 15/77* | (2015.01) | |
| *E05F 15/73* | (2015.01) | |
| *G07C 9/00* | (2020.01) | |
| *E05F 15/611* | (2015.01) | |
| *G06K 9/20* | (2006.01) | |
| *B60N 2/02* | (2006.01) | |
| *B60W 30/06* | (2006.01) | |
| *B60R 21/015* | (2006.01) | |
| *G06K 9/00* | (2006.01) | |

(52) U.S. Cl.
CPC .............. *E05F 15/75* (2015.01); *E05F 15/77* (2015.01); *G07C 9/00309* (2013.01); *B60N 2002/0268* (2013.01); *B60N 2002/0272* (2013.01); *B60R 21/01538* (2014.10); *B60W 30/06* (2013.01); *E05F 15/611* (2015.01); *E05F 2015/767* (2015.01); *E05Y 2400/44* (2013.01); *E05Y 2900/50* (2013.01); *E05Y 2900/531* (2013.01); *G06K 9/00838* (2013.01); *G06K 9/20* (2013.01); *G07C 2209/63* (2013.01); *G07C 2209/64* (2013.01)

(58) Field of Classification Search
CPC ........................................................ E05F 15/75
See application file for complete search history.

(56) References Cited

U.S. PATENT DOCUMENTS

| | | | |
|---|---|---|---|
| 6,548,804 B1 | 4/2003 | Yuhara et al. | |
| 9,442,888 B2 * | 9/2016 | Stanfield | G08G 1/20 |
| 9,834,978 B2 * | 12/2017 | Nania | E05F 15/73 |
| 10,053,905 B2 * | 8/2018 | Norichika | E05F 15/77 |
| 10,183,640 B2 * | 1/2019 | Rhode | E05C 17/006 |

(Continued)

FOREIGN PATENT DOCUMENTS

| | | |
|---|---|---|
| JP | 2000-113164 | 4/2000 |
| JP | 2014-125750 | 7/2014 |
| JP | 2016-160588 | 9/2016 |

*Primary Examiner* — Catherine A Kelly
(74) *Attorney, Agent, or Firm* — Chip Law Group

(57) ABSTRACT

A door control device in a vehicle including seats and doors, includes: a door driver; a seating position detector; and a door controller. The door driver at least drives opening of the doors. The seating position detector detects a seating position information indicating a position of the seat on which an occupant is seated. The door controller determines a door to be opened on the basis of the seating position information detected by the seating position detector and causes the door driver to drive opening of the determined door.

20 Claims, 8 Drawing Sheets

(56) References Cited

U.S. PATENT DOCUMENTS

| | | | |
|---|---|---|---|
| 10,227,810 B2* | 3/2019 | Linden | E05B 81/58 |
| 10,392,837 B2* | 8/2019 | Oomi | B60R 25/24 |
| 10,787,168 B2* | 9/2020 | Tsujino | B60W 50/14 |
| 2007/0188122 A1* | 8/2007 | Andrejciw | E05F 15/431 |
| | | | 318/483 |
| 2009/0030579 A1* | 1/2009 | Takehisa | E05F 15/76 |
| | | | 701/49 |
| 2016/0251890 A1* | 9/2016 | Sakai | E05F 15/73 |
| | | | 340/5.72 |
| 2016/0369551 A1* | 12/2016 | Suzuki | E05F 15/77 |
| 2017/0167179 A1* | 6/2017 | Uratsuji | E05F 15/73 |
| 2017/0213164 A1* | 7/2017 | Rainbolt | B60W 40/08 |
| 2018/0236972 A1* | 8/2018 | Linden | B60R 25/01 |
| 2019/0055770 A1* | 2/2019 | Bars | E05F 15/659 |
| 2019/0126779 A1* | 5/2019 | Saitou | B60N 2/002 |
| 2019/0275938 A1* | 9/2019 | Matsushita | G01S 15/93 |
| 2019/0299847 A1* | 10/2019 | Mori | B60R 25/245 |
| 2020/0012848 A1* | 1/2020 | Goto | B60R 21/01552 |
| 2020/0062172 A1* | 2/2020 | Lujan | B60Q 1/50 |
| 2020/0068400 A1* | 2/2020 | Ramie | H04L 63/0853 |
| 2020/0290626 A1* | 9/2020 | Chen | B60W 40/08 |
| 2020/0353935 A1* | 11/2020 | Menne | B60R 21/01542 |

\* cited by examiner

DOOR CONTROL DEVICE

CROSS-REFERENCE TO RELATED APPLICATIONS

The present application claims priority from Japanese Patent Application No. 2017-196001 filed on Oct. 6, 2017, the entire contents of which are hereby incorporated by reference.

BACKGROUND

1. Technical Field

The present invention relates to a technical field of a door control device which performs control of opening of a door in a vehicle.

2. Related Art

For instance, implementation of an automatic valet parking function is considered as one of functions related to parking assistance of a vehicle. An automatic valet parking function is a function that automates valet parking using an automatic operation technique of a vehicle. Specifically, for instance, an automatic valet parking function is a function in which, in a valet parking facility such as a hotel or a large commercial facility, after a vehicle stops at a predetermined getting-off place and an occupant such as a driver gets off, the vehicle moves to a required parking space and performs parking therein by automatic operation and moves to a predetermined getting-in place by automatic operation in response to a call from the occupant. At this time, as a part of the automatic valet parking function, it is also conceivable that the vehicle automatically performs searching for an empty parking space.

The above-mentioned getting-off place and getting-in place may be the same place.

In the above-described automatic valet parking function, when the vehicle arrives at the getting-in place in response to a call from the occupant, it is conceivable to improve convenience of the occupant by automatically opening a door.

Japanese Unexamined Patent Application Publication (JP-A) No. 2014-125750, JP-A No. 2016-160588, and JP-A No. 2000-113164 can be cited regarding the related art.

SUMMARY OF THE INVENTION

An aspect of the present invention provides a door control device in a vehicle including seats and doors, the door control device including: a door driver configured to at least drive opening of the doors; a seating position detector configured to detect a seating position information indicating a position of the seat on which an occupant is seated; and a door controller configured to determine a door to be opened on the basis of the seating position information detected by the seating position detector and cause the door driver to drive opening of the determined door.

DETAILED DESCRIPTION

Figure 1:
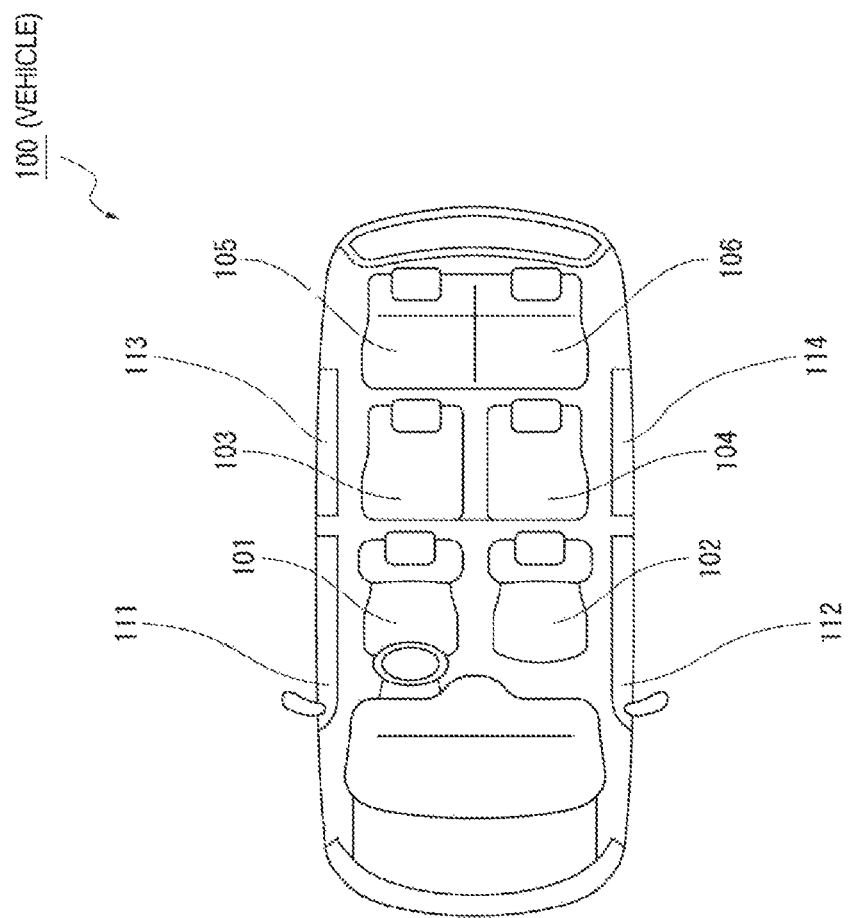
FIG. 1 is a diagram illustrating seats and doors of a vehicle having a door control device according to an example of the present invention.

Hereinafter, preferred examples of the present invention will be described in detail with reference to the appended drawings. Note that the following description is directed to illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. In this specification and the appended drawings, structural elements that have substantially the same function and structure are denoted with the same reference numerals, and repeated description of these structural elements is omitted.

In a case in which doors of a vehicle are automatically opened at a getting-in place, it is conceivable to design doors of all seats to automatically open in consideration of a case in which the number of occupants in the maximum.

However, in this specification, unnecessary doors will be opened when the number of occupants is small. Opening of unnecessary doors gives a space for a person other than an occupant to get in the vehicle, which is undesirable from the viewpoint of security. In addition, opening and closing of unnecessary doors may cause a reduction in the service life of a door opening/closing mechanism.

In order to prevent opening of unnecessary doors, it may be conceivable to cause a door to be opened to be pre-designated by an occupant, but in that case, an operational burden on the occupant increases, and convenience is impaired.

It is desirable to achieve both improved convenience of an occupant and improved security regarding opening control of doors in a vehicle.

<1. Configuration of Vehicle and Vehicle Control System>

Hereinafter, a door control device according to an example of the present invention will be described with reference to the accompanying drawings.

FIG. 1 is a diagram illustrating seats and doors of a vehicle 100 having a door control device according to an example.

The vehicle 100 takes a three rows of seats form as a form of a seat arrangement and has a driver's seat 101 and a passenger's seat 102 provided in a foremost row, a middle row right seat 103 and a middle row left seat 104 provided in a middle row, and a rear row right seat 105 and a rear row left seat 106 provided in a rear row.

In the vehicle 100, a plurality of doors are provided for an occupant getting into a seat and getting off a seat. Specifically, the vehicle 100 of the present instance includes a driver's seat door 111 used for getting in and off the driver's seat 101, a passenger's seat door 112 used for getting in and off the passenger's seat 102, a right sliding door 113 used for getting in and off the middle row right seat 103 and the rear row right seat 105, and a left sliding door 114 used for getting in and off the middle row left seat 104 and the rear row left seat 106.

These doors can be locked and unlocked by an actuator (not illustrated). Further, in the present instance, these doors can be opened and closed by an actuator such as an electric motor, for instance. Hereinafter, in a case in which simply "doors" is stated, "doors" refer to the driver's seat door 111, the passenger's seat door 112, the right sliding door 113, and the left sliding door 114. In a case in which simply "seats" is stated, "seats" refer to the driver's seat 101, the passenger's seat 102, the middle row right seat 103, the middle row left seat 104, the rear row right seat 105, and the rear row left seat 106.

Figure 2:
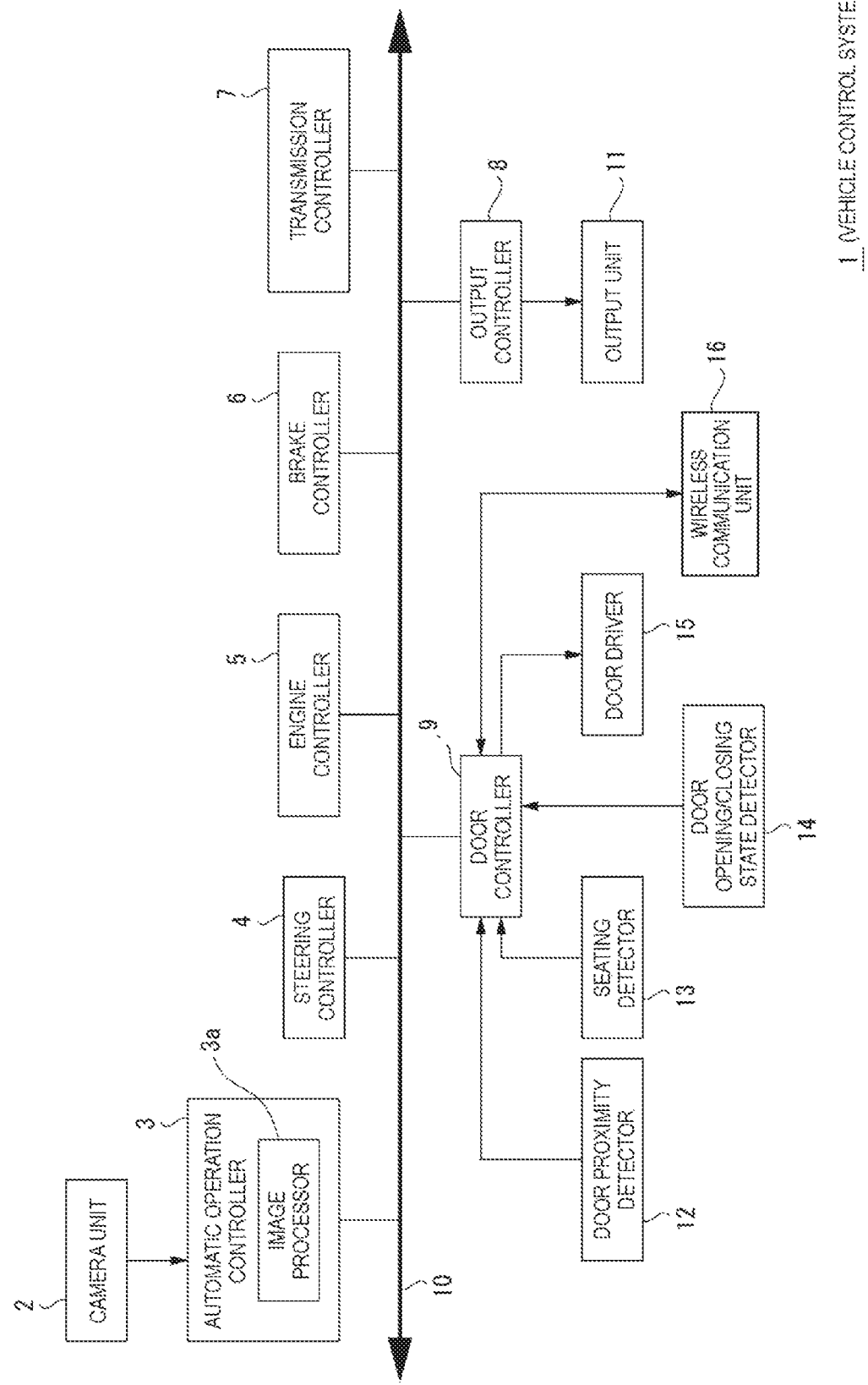
FIG. 2 is a block diagram illustrating a configuration example of a vehicle control system including the door control device according to an example.

FIG. 2 is a block diagram illustrating a configuration example of a vehicle control system 1 including the door control device according to an example.

The vehicle control system 1 includes a camera unit 2, an automatic operation controller 3, a steering controller 4, an engine controller 5, a brake controller 6, a transmission controller 7, an output controller 8, a door controller 9, a bus 10, an output unit 11, a door proximity detector 12, a seating detector 13, a door opening/closing state detector 14, a door driver 15, and a wireless communication unit 16.

For instance, the automatic operation controller 3, the steering controller 4, the engine controller 5, the brake controller 6, the transmission controller 7, the output controller 8, and the door controller 9 each include a microcomputer having a central processing unit (CPU), a read only memory (ROM), a random access memory (RAM), and the like, and are coupled to each other via the bus 10 such that data communication is possible therebetween.

The vehicle 100 of the present instance is a vehicle having an automatic valet parking function. The automatic valet parking function is a function which at least performs, after a vehicle stops at a predetermined getting-off place and an occupant such as a driver gets off, movement of the vehicle to a required parking space and parking therein by automatic operation and movement of the vehicle to a predetermined getting-in place by automatic operation in response to a call from the occupant.

In order to realize the automatic valet parking function, the automatic operation controller 3 is provided in the vehicle control system 1.

The automatic operation controller 3 has a Global Navigation Satellite System (GNSS) sensor which detects the current position of the vehicle 100, has map information stored in an internal memory, and performs various controls for automatic operation on the basis of the current position information detected by the GNSS sensor, the map information, and an image captured by one or a plurality of cameras of the camera unit 2. The camera of the camera unit 2 captures an image in a direction toward outside of the vehicle, and the automatic operation controller 3 performs image analysis on the image captured by the camera of the camera unit 2 by an image processor 3a thereof and recognizes an environment outside the vehicle. For instance, the automatic operation controller 3 performs detection of an object existing outside the vehicle, recognition of a detected object, etc. and recognizes an environment outside the vehicle. On the basis of a result of recognizing the environment outside the vehicle and the above-mentioned current position information and map information, the automatic operation controller 3 gives an instruction on a steering angle or the like to the steering controller 4, an instruction on an accelerator opening degree or the like to the engine controller 5, an instruction on ON/OFF of a brake or the like to the brake controller 6, and an instruction on forward/backward movement or the like to the transmission controller 7 to realize automatic operation.

The specific method of automatic operation control is not directly related to the present invention, and detailed description thereof will be omitted.

On the basis of the instructions from the automatic operation controller 3, the steering controller 4 performs driving control of a steering actuator (not illustrated) (for instance, an actuator provided so that a steering angle can be changed such as a power steering motor) and performs steering angle control.

On the basis of a detection signal from a predetermined sensor provided in the vehicle 100, operation input information by an operator, or the like, the engine controller 5 controls various actuators provided as engine-related actuators (not illustrated). As the engine-related actuators, for instance, various actuators related to engine driving such as a throttle actuator which drives a throttle valve or an injector which injects fuel are provided. The engine controller 5 performs start/stop control of the engine in response to an operation of a predetermined operator such as an ignition switch provided in the vehicle 100, an instruction from the automatic operation controller 3, or the like. Further, on the basis of a detection signal from a predetermined sensor such as an engine speed sensor or an accelerator opening degree sensor, an instruction from the automatic operation controller 3, or the like, the engine controller 5 performs control of a fuel injection timing, a fuel injection pulse width, a throttle opening degree, and the like.

On the basis of a detection signal from a predetermined sensor provided in the vehicle 100, operation input information by an operator, or the like, the brake controller 6 controls various actuators provided as brake-related actuators (not illustrated. As the brake-related actuators, for instance, various brake-related actuators such as a hydraulic pressure control actuator which controls an output hydraulic pressure from a brake booster to a master cylinder or a hydraulic pressure in a brake fluid pipe are provided. The brake controller 6 calculates a slip ratio of a vehicle wheel from detection information of a predetermined sensor (for instance, an axle rotation speed sensor or a vehicle speed sensor) and increases or decreases a hydraulic pressure using the above-mentioned hydraulic pressure control actuator according to a slip ratio, thereby realizing so-called antilock brake system (ABS) control. Further, on the basis of an instruction from the automatic operation controller 3, the brake controller 6 controls the above-mentioned hydraulic pressure control actuator such that ON/OFF of the brake or the like is controlled.

On the basis of a detection signal from a predetermined sensor provided in the vehicle 100, operation input information by an operator, or the like, the transmission controller 6 controls various actuators provided as transmission-related actuators (not illustrated). As the transmission-related actuators, for instance, a gear shift actuator which performs gear shift control of an automatic transmission of the vehicle 100, a forward/backward movement switching actuator which controls operation of a forward/backward movement switching mechanism, or the like is provided. For instance, the transmission controller 7 outputs a gear shift signal to the above-mentioned gear shift actuator according to a predetermined gear shift pattern and performs gear shift control. Further, on the basis of an instruction from the automatic operation controller 3, the transmission controller 7 controls the above-mentioned forward/backward movement switching actuator such that forward/backward movement switching of the vehicle 100 is controlled.

The output unit 11 comprehensively represents devices which perform output of various pieces of information, such as a speaker, various display devices, and a light, provided in the vehicle 100. The output unit 11 of the present instance is capable of outputting information on the outside of the vehicle as well as the inside of the vehicle. For instance, the output unit 11 may output a notification sound related to the outside of the vehicle.

The output controller 8 controls the output unit 11 and executes output of various pieces of information.

The door controller 9 performs control of the doors of the vehicle 100. As illustrated, the door proximity detector 12, the seating detector 13, the door opening/closing state detector 14, the door driver 15, and the wireless communication unit 16 are coupled to the door controller 9.

The door proximity detector 12 comprehensively represents sensors which detect the proximity of an object to the doors. For instance, the door proximity detector 12 of the present instance has, for each door, a sensor capable of detecting the presence of an object or a distance to an object, such as an ultrasonic sensor or a laser sensor.

The seating detector 13 comprehensively represents sensors which detect whether an occupant is seated on a seat. The seating detector 13 of the present instance has, for each seat, a pressure sensor embedded in a lower part of a seat surface of a seat.

The door opening/closing state detector 14 comprehensively represents devices which detect which state from an open state or a closed state a door is in. In the present instance, a door switch (for instance, a switch which is conductive when the door is in a closed state and is brought into a nonconductive state when the door is in an open state) is used as a device which detects which state from an open state or a closed state the door is in. The door opening/closing state detector 14 has the door switch for each door.

The door driver 15 has, for each door, an actuator such as an electric motor which opens and closes the door independently of human power, that is, automatically, and has a driving circuit which drives the actuator. For instance, the driving circuit may be provided for each actuator, and the door controller 9 may be capable of performing opening and closing control independently for each door by giving individual instructions to the driving circuits.

The wireless communication unit 16 comprehensively represents communication devices which perform wireless communication with an electronic device outside the vehicle control system 1. For instance, the wireless communication unit 16 may have a communication device which performs wireless communication with a portable electronic device (hereinafter referred to as "portable device") carried by an occupant as a driver. Although not illustrated, an opening button for giving an instruction to open a predetermined door (for instance, the right sliding door 113 or the left sliding door 114) is provided in the portable device, and when the opening button is operated, the portable device wirelessly transmits an opening instruction signal for giving an instruction to open a target door. The opening instruction signal is received by the door controller 9 via the wireless communication unit 16. The door controller 9 gives an instruction to the door driver 15 so that a target door is opened in response to the opening instruction signal. As a result, the occupant can automatically open a predetermined door such as the right sliding door 113 or the left sliding door 114 by wireless operation using the portable device.

Further, although not illustrated, a locking/unlocking mechanism and an actuator such as a solenoid which drives the locking/unlocking mechanism are provided for each door in the vehicle 100, and the door controller 9 performs driving control of the actuator, thereby controlling locking/unlocking of each door.

A button for instructing unlocking or locking of a door is provided in the portable device. Upon receiving, via the wireless communication unit 16, a signal, which instructs unlocking or locking of a door, wirelessly transmitted by the portable device according to operation of the button, the door controller 9 controls the above-mentioned actuator according to the instruction and realizes unlocking or locking of the door. At this time, the door controller 9 performs the above-described unlocking or locking of a door or opening of a predetermined door under the condition that an instruction signal related thereto is a signal transmitted by a specific portable device. Specifically, an ID (unique identification information) for authentication is stored in the portable device. The door controller 9 acquires the ID from the portable device, performs an authentication process, and allows unlocking or locking of a door or opening of a door to be performed according to an instruction signal from the portable device only in a case in which authentication is established.

Further, in the present instance, an operator (for instance, a button) for instructing movement from a getting-off place of the vehicle 100 to a parking space and parking therein (that is, waiting in the parking space) or movement from the parking space to a getting-in place (picking up an occupant) in the automatic valet parking function is provided in the portable device. In a case in which the door controller 9 has received, via the wireless communication unit 16, an instruction signal transmitted by the portable device according to operation of the operator, the door controller 9 transmits the instruction signal to the automatic operation controller 3.

The automatic operation controller 3 performs automatic operation control so that, in response to the instruction signal, the movement to the parking space and parking therein and the movement from the parking space to the getting-in place of the vehicle 100 are performed. The operator for instructing the movement to the parking space and parking therein of the vehicle 100 may be provided at the vehicle 100 side.

Hereinafter, instruction signals related to the above-described automatic valet parking function transmitted by the portable device, that is, an instruction signal instructing the movement from the getting-off place to the parking space and parking therein of the vehicle 100 and an instruction signal instructing the movement from the parking space to the getting-in place of the vehicle 100 is referred to as a "waiting instruction signal" and "call signal," respectively.

Further, for instance, the wireless communication unit 16 of the present instance has a function of connecting to a predetermined communication network such as the Internet. As a result, the door controller 9 is capable of performing data communication with an external electronic device (for instance, a server device) via a predetermined communication network via the wireless communication unit 16 and is capable of performing information searching on a network and information acquisition via a network.

<2. Door Opening Control According to Example>

[2-1. Overview of Control]

On the basis of a signal or the like detected by the door proximity detector 12 or the seating detector 13, the door controller 9 performs door opening control in consideration of convenience of an occupant or security.

Figure 3A:
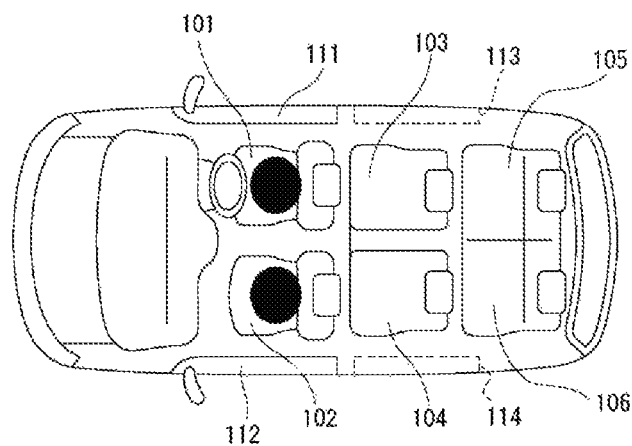
FIG. 3A, FIG. 3B and FIG. 3C are explanatory diagrams of an overview of door opening control according to an example.
Figure 3B:
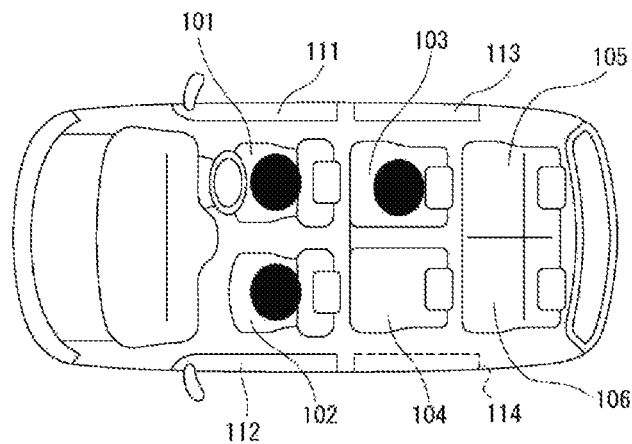
Figure 3C:
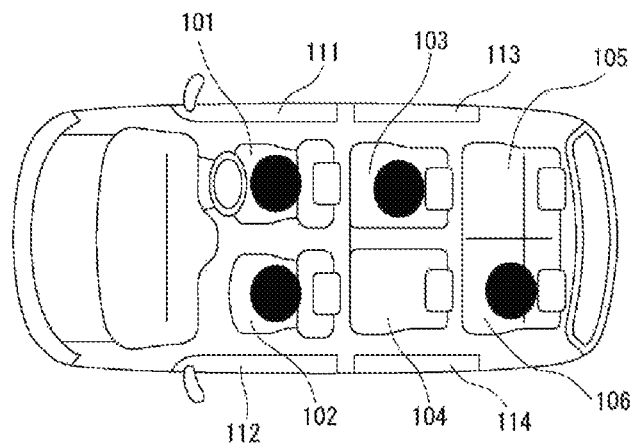

FIGS. 3A to 3C are explanatory diagrams of an overview of the door opening control that the door controller 9 performs according to an example.

First, it is assumed that automatic door opening in the present instance is performed under the condition that the movement of the vehicle 100 to the getting-in place has been completed (the vehicle 100 is stopped at the getting-in place) by the automatic valet parking function. FIGS. 3A, 3B, and 3C illustrate states in which occupants are seated immediately before use of the automatic valet parking function, in other words, a state in which occupants are seated immediately before the vehicle 100 stops at a getting-off place and the occupants get off the vehicle 100 (hereinafter referred to as "seating state during getting off").

FIG. 3A illustrates an instance in which occupants are seated in the driver's seat 101 and the passenger's seat 102; FIG. 3B illustrates an instance in which occupants are seated in the driver's seat 101, the passenger's seat 102, and the middle row right seat 103; and FIG. 3C illustrates an instance in which occupants are seated in the driver's seat 101, the passenger's seat 102, the middle row right seat 103, and the rear row left seat 106.

In the door opening control of the example, basically, a door defined as the door nearest to a seat where an occupant is seated during getting off is determined as a door scheduled to be opened. Specifically, in the case of FIG. 3A, the driver's seat door 111 and the passenger's seat door 112 are determined as doors scheduled to be opened. In the case of FIG. 3B, the driver's seat door 111, the passenger's seat door 112, and the right sliding door 113 are determined as doors scheduled to be opened, and in the case of FIG. 3C, the driver's seat door 111, the passenger's seat door 112, the right sliding door 113, and the left sliding door 114 are determined as doors scheduled to be opened.

In the present instance, the driver's seat door 111 is set as a door which is always opened.

Here, the above-described "door scheduled to be opened" (hereinafter referred to as "door to be opened") may be said to be a door candidate for opening. As will become apparent in the following description, the door to be opened in the present instance may not be opened depending on conditions in some cases.

To perform the above-described determination of a door to be opened, the door controller 9 performs a process of storing "seating information during getting off," which is information indicating the above-described "seating state during getting off." In the present instance, as the "seating information during getting off," information indicating a seating state during stopping immediately before a start point timing (that is, during stopping at the getting-off place) is stored, with a timing at which the above-described "waiting instruction signal" from the portable device is received set as the start point timing. Specifically, information indicating a seating state is information indicating at least seats on which occupants are seated.

Regarding a door which is designated as a target to be opened through the door-to-be-opened determination process, immediately opening the door upon arrival at the getting-in place may cause deterioration of security (since there may be a case in which an occupant has not yet arrived at the getting-in place at the time the vehicle 100 has arrived).

Accordingly, in the present instance, a condition that an occupant is in the proximity of a door is set as a condition for opening the door. Specifically, opening of the door is performed under the condition that a state in which an occupant is in the proximity of the door has continued for a predetermined time or longer.

Further, depending on which of left and right sides the getting-in place is located with respect to the vehicle 100, there is a possibility that the door determined as the door to be opened may not be an appropriate door that facilitates getting-in of the occupant.

Figure 4:
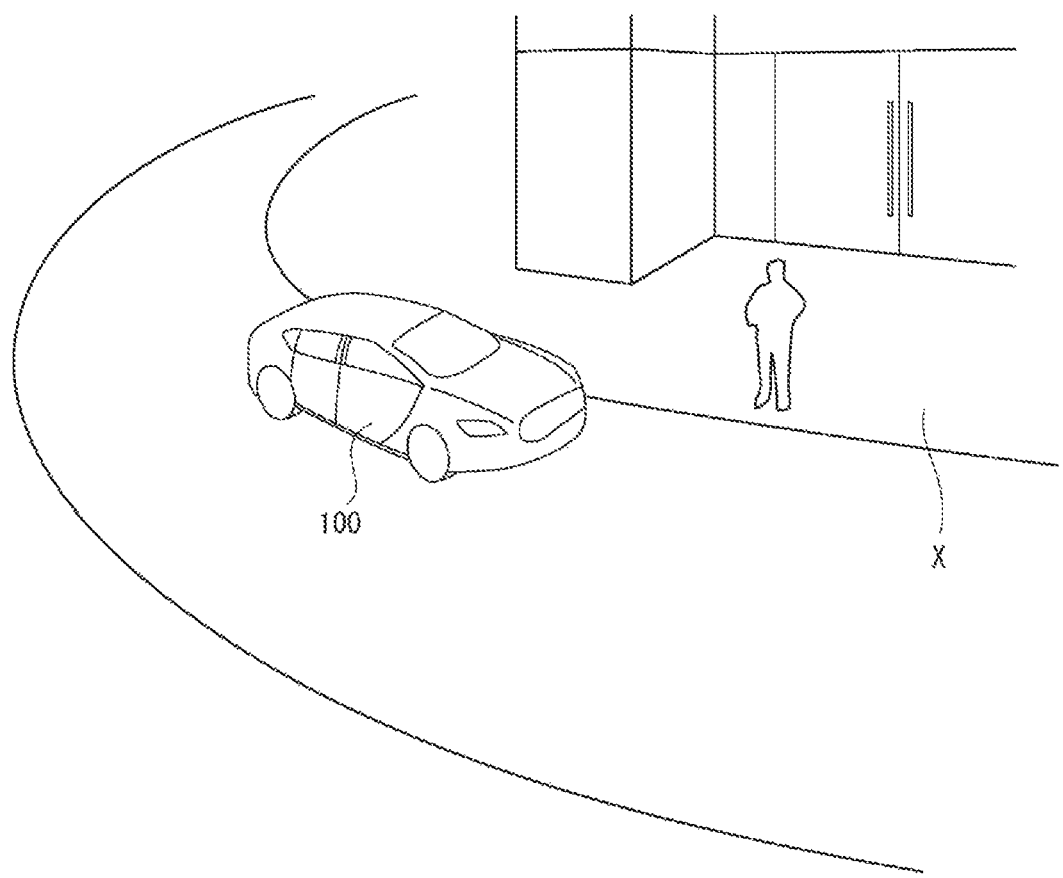
FIG. 4 is a diagram illustrating an instance of a getting-in place in valet parking.

FIG. 4 illustrates a getting-in place in valet parking ("X" in the drawing is an instance of a getting-in place). As illustrated in FIG. 4, in a case in which a getting-in place is located at the left side of the vehicle 100, since an occupant is located at the left side of the vehicle 100, especially for an occupant of a seat in the middle row or behind, the ease of getting-in is improved when a door on the left side, rather than a door on the right side, is opened.

For this reason, in the present instance, regarding doors used for getting in and off the seats in the middle row or behind, that is, the right sliding door 113 and the left sliding door 114, even when either of the doors is determined as a door to be opened, a door at the opposite side is re-determined as a door to be opened in a case in which the determined door is not located at the same side as the getting-in place. Specifically, when the getting-in place is at the left side of the vehicle 100 in a case in which the right sliding door 113 has been determined as a door to be opened, the determination of the right sliding door 113 as the door to be opened is cancelled, and the left sliding door 114 is determined as the door to be opened. Conversely, when the getting-in place is at the right side of the vehicle 100 in a case in which the left sliding door 114 has been determined as a door to be opened, the determination of the left sliding door 114 as the door to be opened is cancelled, and the right sliding door 113 is determined as the door to be opened.

In the present instance, the door-to-be-opened determination also corresponds to an increase in the number of occupants in comparison to that during getting-off at the getting-off place.

In the present instance, an operator which instructs an increase in the number of occupants is provided in the above-described portable device carried by an occupant, and the portable device transmits a number-of-occupants increase signal according to operation of the operator.

In a case in which the number-of-occupants increase signal is received via the wireless communication unit 16, the door controller 9 performs door-to-be-opened determination corresponding to the increase in the number of occupants. In the present instance, the door-to-be-opened determination according to the increase in the number of occupants is performed in a case in which only the driver's seat 101 is a seating position during getting off and a case in which only the driver's seat 101 and the passenger's seat 102 are seating positions during getting off. In other words, in a case in which the driver's seat 101, the passenger's seat 102, and seats in the middle row and behind are seating positions during getting off, the door-to-be-opened determination according to the increase in the number of occupants is not performed.

Specifically, in a case in which only the driver's seat 101 is a seating position during getting off, the door controller 9 determines any one of the passenger's seat door 112, the right sliding door 113, and the left sliding door 114 as an additional door to be opened. Also, in a case in which only the driver's seat 101 and the passenger's seat 102 are seating positions during getting off, the door controller 9 determines the right sliding door 113 or the left sliding door 114 as an additional door to be opened.

Description has been given above by assuming that only an instruction for adding one occupant is possible as an instruction for adding an occupant. However, an instruction for adding two or more occupants may also be possible. At this time, the number of occupants that can be instructed to be added is set in consideration of the maximum number of occupants allowed.

As an instance, in a case in which the number of added occupants is two or more, it is conceivable to determine the passenger's seat door 112 and the right sliding door 113 or the left sliding door 114 as additional doors to be opened when only the driver's seat 101 is a seating position during getting off, and it is conceivable to determine the right sliding door 113 or the left sliding door 114 as an additional door to be opened in a case in which only the driver's seat 101 and the passenger's seat 102 are seating positions during getting off.

At this time, the number of doors determined as additional doors to be opened may be increased according to the size of the increase in the number of occupants. For instance, in the case in which only the driver's seat 101 and the passenger's seat 102 are seating positions during getting off, the right sliding door 113 or the left sliding door 114 is determined as an additional door to be opened when the number of added occupants is two, and both the right sliding door 113 and the left sliding door 114 are determined as additional doors to be opened when the number of added occupants is three.

In the present instance, the door controller 9 limits an opening amount of a door in a case in which it is determined that there is rainfall on the vehicle 100. By limiting the opening amount of a door as described above, wetting of an interior portion of the vehicle 100 due to rainfall can be suppressed. A method of determining whether there is rainfall on the vehicle 100 will be described below.

In a case in which proximity of an occupant to a door other than a door to be opened is detected, when a state in which the occupant is in the proximity of the door is continued for a predetermined time or longer, the door controller 9 of the present instance determines the door as a door to be opened.

When driving opening of a door which is determined as a door to be opened, the door controller 9 of the present instance determines whether an object exists on an opening trajectory of the door and, in a case in which an object exists thereon, gives notification of the fact to an occupant. As the notification, in the present instance, an output of a notification sound via a speaker of the output unit 11 is performed. Also, a visual notification is given to an occupant by driving opening of the door within an opening amount range in which the door does not come into contact with the object.

[2-2. Procedure of Process]

Figure 5:
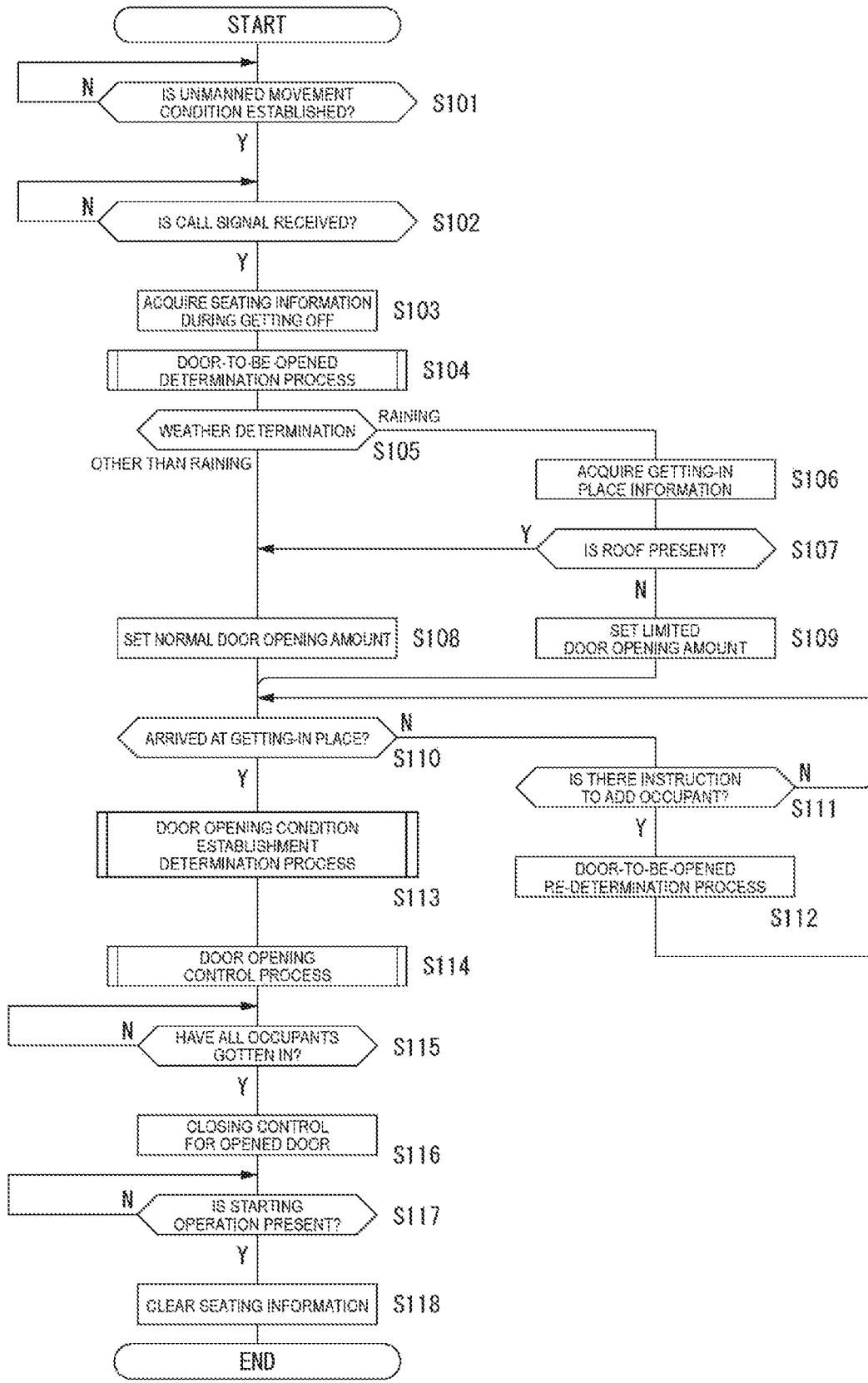
FIG. 5 is a flowchart illustrating a specific procedure of a process to be executed to realize door opening control according to an example.

The flowchart of FIG. 5 illustrates a specific procedure of a process that the door controller 9 has to execute in order to realize the door opening control according to the above-described example.

First, in Step S101, the door controller 9 waits until an unmanned movement condition is established. Specifically, the door controller 9 determines whether the "waiting instruction signal" transmitted according to an operation by the above-described portable device is received via the wireless communication unit 16. As it is understood from the above description, according to establishment of the unmanned movement condition, the door controller 9 stores information indicating a seating state during stopping immediately before a start point timing as "seating information during getting off," with a timing at which the condition is established set as the start point timing.

In a case in which the unmanned movement condition is established, the door controller 9 waits for reception of a call signal from the portable device in Step S102, and in a case in which the call signal is received, the door controller 9 acquires seating information during getting off in Step S103. That is, the door controller 9 acquires the seating information during getting off" stored according to the establishment of the unmanned movement condition in Step S101.

In the following Step S104, the door controller 9 performs a door-to-be-opened determination process.

Figure 6:
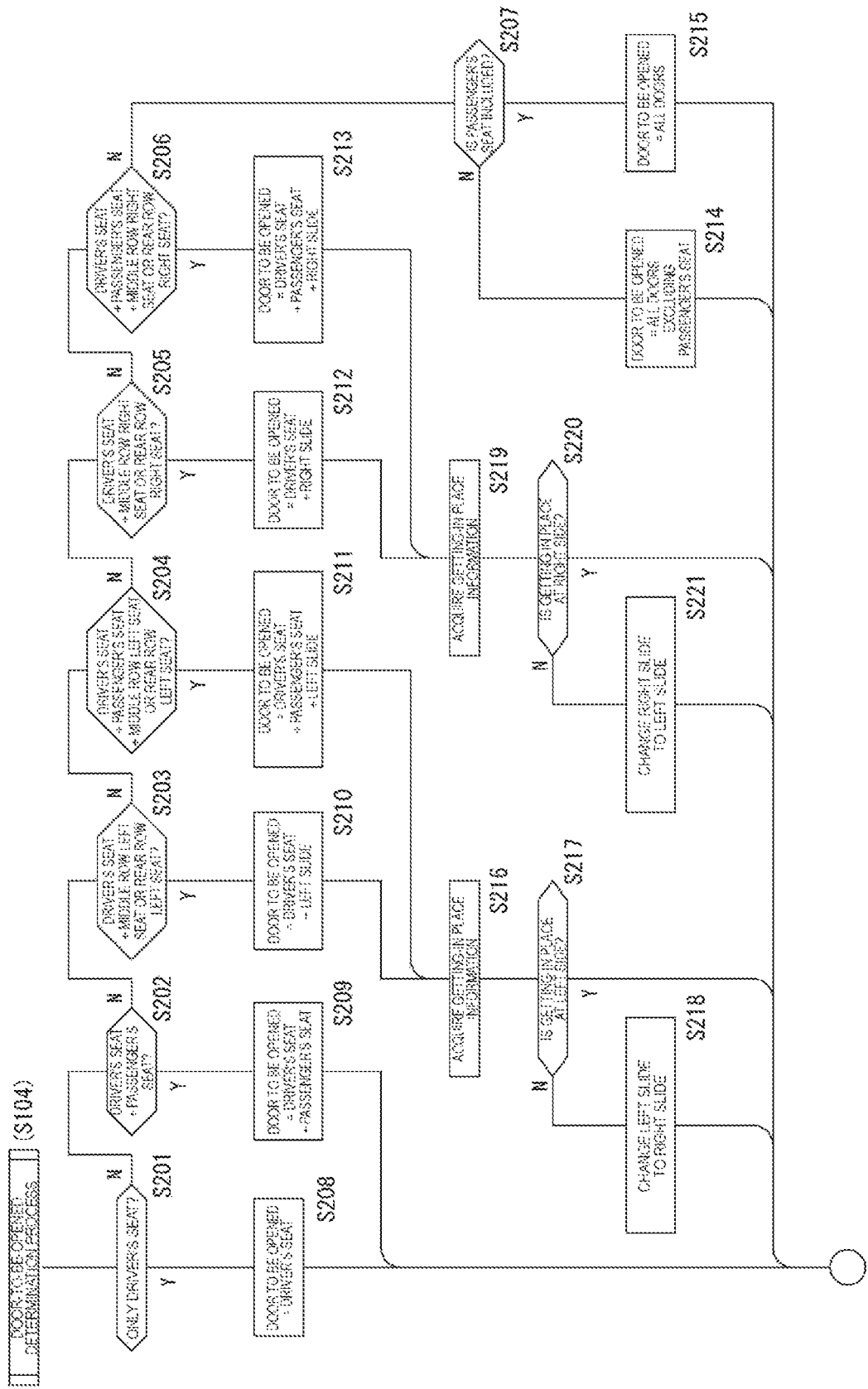
FIG. 6 is a flowchart of a door-to-be-opened determination process illustrated in FIG. 5.

FIG. 6 is a flowchart illustrating the door-to-be-opened determination process in Step S104.

As illustrated, in the door-to-be-opened determination process, first, by a determination process of Steps S201 to S206, which of only the driver's seat 101 (S201), the driver's seat 101+the passenger's seat 102 (S202), the driver's seat 101+the middle row left seat 104 or the rear row left seat 106 (S203), the driver's seat 101+the passenger's seat 102+the middle row left seat 104 or the rear row left seat 106 (S204), the driver's seat 101+the middle row right seat 103 or the rear row right seat 105 (S205), and the driver's seat 101+the passenger's seat 102+the middle row right seat 103 or the rear row right seat 105 (S206) a seating position during getting off specified from the acquired seating information during getting off corresponds to is determined.

In Step S201, when only the driver's seat 101 is the seating position, the door controller 9 determines the driver's seat door 111 as a door to be opened in Step S208 and ends the door-to-be-opened determination process. In Step S202, when the driver's seat 101+the passenger's seat 102 are the seating positions, the door controller 9 determines the driver's seat door 111 and the passenger's seat door 112 as doors to be opened in Step S209 and ends the door-to-be-opened determination process.

In Step S203, in the case in which the driver's seat 101+the middle row left seat 104 or the rear row left seat 106 are the seating positions, the door controller 9 determines the driver's seat door 111 and the left sliding door 114 as doors to be opened in Step S210. In Step S204, in the case in which the driver's seat 101+the passenger's seat 102+the middle row left seat 104 or the rear row left seat 106 are the seating positions, the door controller 9 determines the driver's seat door 111, the passenger's seat door 112, and the left sliding door 114 as doors to be opened in Step S211.

In Step S205, in the case in which the driver's seat 101+the middle row right seat 103 or the rear row right seat 105 are the seating positions, the door controller 9 determines the driver's seat door 111 and the right sliding door 113 as doors to be opened in Step S212. In Step S206, in the case in which the driver's seat 101+the passenger's seat 102+the middle row right seat 103 or the rear row right seat 105 are the seating positions, the door controller 9 determines the driver's seat door 111, the passenger's seat door 112, and the right sliding door 113 as doors to be opened in Step S213.

In Step S206, in a case in which the driver's seat 101+the passenger's seat 102+the middle row right seat 103 or the rear row right seat 105 are not the seating positions, the door controller 9 proceeds to Step S207. Here, a seating state when a negative result is obtained in Step S206 is a state in which occupants are seated in both a left side seat and a right side seat of seats in a middle row and behind. That is, in the present instance, the seating state corresponds to a state in which both the right sliding door 113 and the left sliding door 114 have to be opened.

In Step S207, the door controller 9 determines whether the passenger's seat 102 is included as the seating position. In a case in which the passenger's seat 102 is not included, the door controller 9 proceeds to Step S214, determines all of the doors excluding the passenger's seat door 112 as doors to be opened, and ends the door-to-be-opened determination process. Meanwhile, in a case in which the passenger's seat 102 is included, the door controller 9 proceeds to Step S215, determines all of the doors as doors to be opened, and ends the door-to-be-opened determination process.

Through the above-described process, in the present instance, a door defined as the door nearest to each seat on which an occupant is seated during getting off is determined as a door to be opened.

In a case in which the determination of doors to be opened is performed in Steps S210, S211, S212, and S213, the door controller 9 executes a process according to whether the getting-in place is at the left side or right side of the vehicle 100.

Specifically, in a case in which doors to be opened are determined in one of Steps S210 and S211, the door controller 9 proceeds to Step S216 and performs a getting-in place information acquisition process. In the present instance, determination on which of the left and right sides of the vehicle 100 the getting-in place is located is performed by acquiring getting-in place information from a network by communication via the wireless communication unit 16. A process of Step S216 is a process in which information indicating at least left and right positions of the getting-in place is acquired as the getting-in place information from the network. As a specific process, for instance, the door controller 9 transmits current position information of the vehicle 100 to a predetermined server device on the network and makes a request for the getting-in place information. Location information or getting-in place information of each valet parking facility is managed at the server device side. The server device specifies a valet parking facility in which the vehicle 100 is located and acquires getting-in place information of the specified facility on the basis of the received current position information of the vehicle 100, and transmits the acquires getting-in place information to the vehicle 100 (the door controller 9). For instance, the door controller 9 uses current position information detected by the above-described GNSS sensor of the automatic operation controller 3 as the current position information of the vehicle 100.

Various methods may be considered as a method of acquiring getting-in place information, and the method is not limited thereto. For instance, a method in which getting-in place information for each facility is stored in the vehicle 100 (for instance, stored in the door controller 9) and acquisition of the getting-in place information is completed in the vehicle 100 may also be considered.

In Step S217 subsequent to Step S216, the door controller 9 determines whether the getting-in place is at the left side. When the getting-in place is at the left side, the door controller 9 ends the door-to-be-opened determination process. Meanwhile, when the getting-in place is not at the left side, the door controller 9 proceeds to Step S218, changes the left sliding door 114 to the right sliding door 113, and ends the door-to-be-opened determination process. That is, the door controller 9 cancels determination of the left sliding door 114 as a door to be opened which has been made in Step S210 or S211 and determines the right sliding door 113 as a new door to be opened.

In a case in which the doors to be opened are determined in any one of Steps S212 and S213, the door controller 9 proceeds to Step S219, and performs the getting-in place information acquisition process. Since the acquisition process in Step S219 is the same as the acquisition process in Step S216, repeated description will be avoided.

In subsequent Step S220, the door controller 9 determines whether the getting-in place is at the right side. When the getting-in place is at the right side, the door controller 9 ends the door-to-be-opened determination process. When the getting-in place is not at the right side, the door controller 9 proceeds to Step S218, changes the right sliding door 113 to the left sliding door 114, and ends the door-to-be-opened determination process. As a result, determination of the right sliding door 113 as a door to be opened which has been made in Step S212 or S213 is cancelled, and the left sliding door 114 is determined as a new door to be opened.

In the above description, it has been assumed that a door to be opened is not changed according to left and right positions of the getting-in place in the case in which both the right sliding door 113 and the left sliding door 114 are set as doors to be opened. However, only the right sliding door 113 of the right sliding door 113 and the left sliding door 114 may be set as a door to be opened in a case in which the getting-in place is at the right side of the vehicle 100, and only the left sliding door 114 of the right sliding door 113 and the left sliding door 114 may be set as a door to be opened in a case in which the getting-in place is at the left side of the vehicle 100.

Description will be given by referring again to FIG. 5.

Upon completion of the door-to-be-opened determination process in Step S104, the door controller 9 executes a weather determination process in step S105. As the weather determination process, at least whether rainfall is present at the current location is determined. In the present instance, the weather determination process is performed on the basis of a result of acquiring weather information from the network. Specifically, the door controller 9 transmits the current position information of the vehicle 100 to a predetermined server device on the network and requests the predetermined server device for weather information in the current location via the wireless communication unit 16, and determines, on the basis of the weather information received in response to the request, whether the weather at the current location is rainy. When the weather at the current location is other than rainy, the door controller 9 sets a normal door opening amount in Step S108 and advances the process to Step S110. Here, as will be described below, the door opening amount is information for designating a door opening amount when executing driving of opening of a door to be opened (see Step S403 in FIG. 8).

Meanwhile, when the weather of the current location is rainy, the door controller 9 performs a getting-in place information acquisition process in Step S106 and determines whether a roof is present at the getting-in place in subsequent Step S107. Here, getting-in place information acquired in Step S107 is information including information indicating at least whether a roof is present at the getting-in place (whether rainfall on the vehicle 100 can be avoided). Since the information acquisition method in Step S107 is the same as the information acquisition method in Step S216 described above, repeated description will be avoided. In Step S107, the door controller 9 determines whether a roof is present at the getting-in place on the basis of the getting-in place information acquired as described above.

When a roof is present at the getting-in place, the door controller 9 sets a normal door opening amount in the above-described Step S108 and advances the process to Step S110. Meanwhile, when a roof is not present at the getting-in place, the door controller 9 sets a limited door opening amount in Step S109 and proceeds to Step S110. Here, the limited door opening amount refers to a door opening amount smaller than the above-mentioned normal door opening amount.

By the above-described process, even when the weather of the current location is rainy, in a case in which it is presumed that there is no rainfall on the vehicle 100, the normal door opening amount is set instead of the limited door opening amount.

Whether there is rainfall on the vehicle can also be determined on the basis of a detection signal of a rain sensor provided in the vehicle 100.

In Step S110, the door controller 9 determines whether the vehicle 100 has arrived at the getting-in place. In the present instance, when the vehicle 100 has arrived at the getting-in place, the automatic operation controller 3 gives notification of the fact to the door controller 9. The determination process in Step S110 is a process in which a presence of the notification is determined.

In a case in which the notification is not present and it is determined in Step S110 that the vehicle 100 has not arrived at the getting-in place, the door controller 9 determines a presence of an instruction for adding an occupant in Step S111. That is, the door controller 9 determines whether a number-of-occupants increase signal is received from the portable device. In a case in which the number-of-occupants increase signal is not received and it is determined that an instruction for adding an occupant is not present, the door controller 9 returns to Step S110.

By the process of Steps S110 and S111, while the vehicle 100 moves to the getting-in place after receiving a call from an occupant (in the present instance, the door-to-be-opened determination process based on the seating information during getting off is performed during this movement), a loop process waiting for either arrival at the getting-in place or instruction for adding an occupant is formed.

In Step S111, in a case in which the instruction for adding an occupant is present, the door controller 9 performs a door-to-be-opened re-determination process in Step S112 and returns to Step S110. As described above, the door-to-be-opened re-determination process may be a process assuming that the number of added occupants is only "1" or a process assuming that an instruction for adding a plurality of occupants is permitted within a range taking into consideration the maximum number of occupants allowed. In either case, a method which is the same as that described above is adopted as a specific process method. Repeated description will be avoided.

In a case in which it is determined that the vehicle 100 has arrived at the getting-in place in Step S110, the door controller 9 passes Step S112 and advances the process to Step S113.

In Step S113, the door controller 9 executes a door opening condition establishment determination process and executes a door opening control process in subsequent Step S114.

Figure 7:
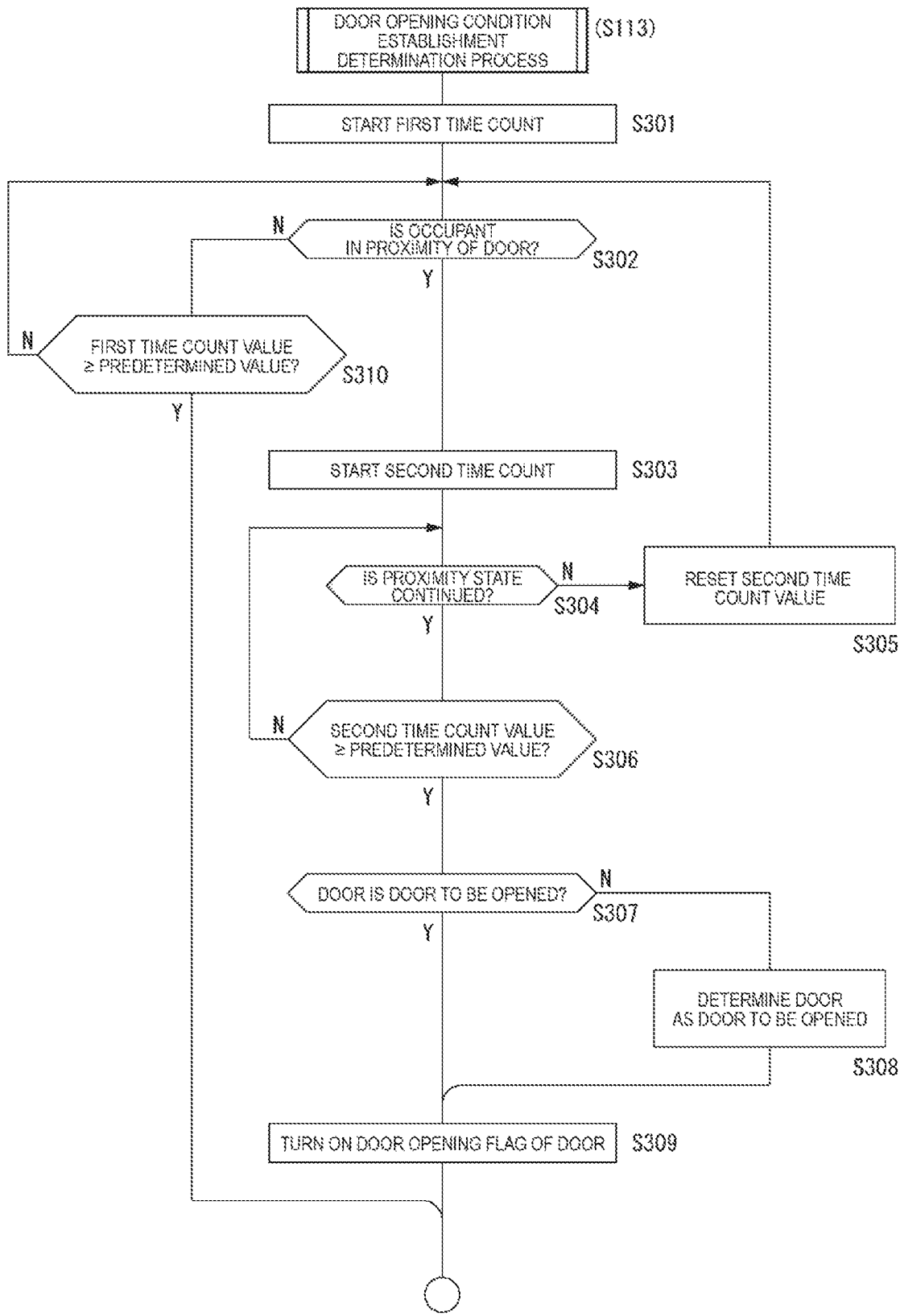
FIG. 7 is a flowchart of a door open condition establishment determination process illustrated in FIG. 5.

FIG. 7 is a flowchart illustrating the door opening condition establishment determination process in Step S113.

The process illustrated in FIG. 7 illustrates a process executed on a single door among the doors, and the door controller 9 performs the process illustrated in FIG. 7 for each door (regardless of whether the door is a door to be opened) in parallel.

In FIG. 7, the door controller 9 starts a first time count in Step S301. The first time count is a time count for measuring a duration time of a state in which an occupant is not in the proximity of the door (the door which is subject to the process in FIG. 7).

In subsequent Step S302, the door controller 9 determines whether an occupant is in the proximity of the door. For instance, the proximity determination is performed by determining whether an object whose distance from the door is within a predetermined distance is detected, on the basis of a detection signal of a sensor provided for the door in the door proximity detector 12 (for instance, the above-described sensor capable of detecting a distance to an object such as an ultrasonic sensor).

In Step S302, in a case in which it is determined that an occupant is not in the proximity of the door, the door controller 9 determines whether a first time count value is a predetermined value or greater in Step S310, returns to Step S302 when the first time count value is not the predetermined value or greater, and ends the door opening condition establishment determination process when the first time count value is the predetermined value or greater.

As a result, in a case in which a state in which the proximity of an occupant to the door is not detected is continued for a predetermined time or longer after the vehicle 100 arrives at the getting-in place, a door opening flag (Step S309) which will be described below is not turned ON, and the door is excluded from doors to be opened. That is, in a case in which an occupant is not expected to get in from the door, it is possible to prevent unnecessary opening of the door.

When measuring the duration time of the state in which the occupant is not in the proximity of the door, for instance, instead of the above-described timing at which the vehicle 100 arrives at the getting-in place, a timing at which the occupant arrives at the getting-in place may be set as the measurement start timing. In that case, it is conceivable to start the first time count under the condition that the portable device is detected within a range in which communication by the wireless communication unit 16 is possible.

Meanwhile, in a case in which it is determined in Step S302 that the occupant is in the proximity of the door, the door controller 9 starts a second time count in Step S303. The second time count is a time count for measuring a duration time of a state in which the occupant is in the proximity of the door.

In Step S304 subsequent to Step S303, the door controller 9 determines whether the proximity state (the state in which the occupant is in the proximity of the door) is continued, and in a case in which the proximity state is continued, determines whether a second time count value is a predetermined value or greater in Step S306. That is, the door controller 9 determines whether the duration time of the state in which the occupant is in the proximity of the door is a predetermined time or longer.

When the second time count value is not the predetermined value or greater in Step S306, the door controller 9 returns to Step S304. Then, in a case in which it is determined in Step S304 that the proximity state is not continued, the door controller 9 resets the second time count value in Step S305, returns to Step S302, and re-determines whether the occupant is in the proximity of the door. As a result, even when proximity of the occupant to the door is detected, in a case in which the proximity state is not continued for the predetermined time or longer, the door opening flag of the door is not turned on, and the door is not set as a door to be opened.

When the second time count value is the predetermined value or greater in Step S306, the door controller 9 determines whether the door is a door to be opened in Step S307. Then, when the door is a door to be opened, the door controller 9 turns on the door opening flag of the door in Step S309 and ends the door opening condition establishment determination process. Meanwhile, when the door is not a door to be opened in Step S307, the door controller 9 determines the door as a door to be opened in Step S308, executes the process of turning ON the door opening flag in Step S309, and ends the door opening condition establishment determination process.

By the above-described process, in a case in which the door is a door to be opened, the door is set as a door to be opened in response to the continuation of the state in which the occupant is in the proximity of the door for the predetermined time or longer, and even in a case in which the door is not a door to be opened, the door is set as a door to be opened in response to the continuation of the state in which the occupant is in the proximity of the door for the predetermined time or longer.

Even when a door is a door other than a door to be opened, it is possible to adaptively set the door, which is presumed as a door through which the occupant can actually easily get in, as a door to be opened, thereby enhancing convenience of the occupant.

Figure 8:
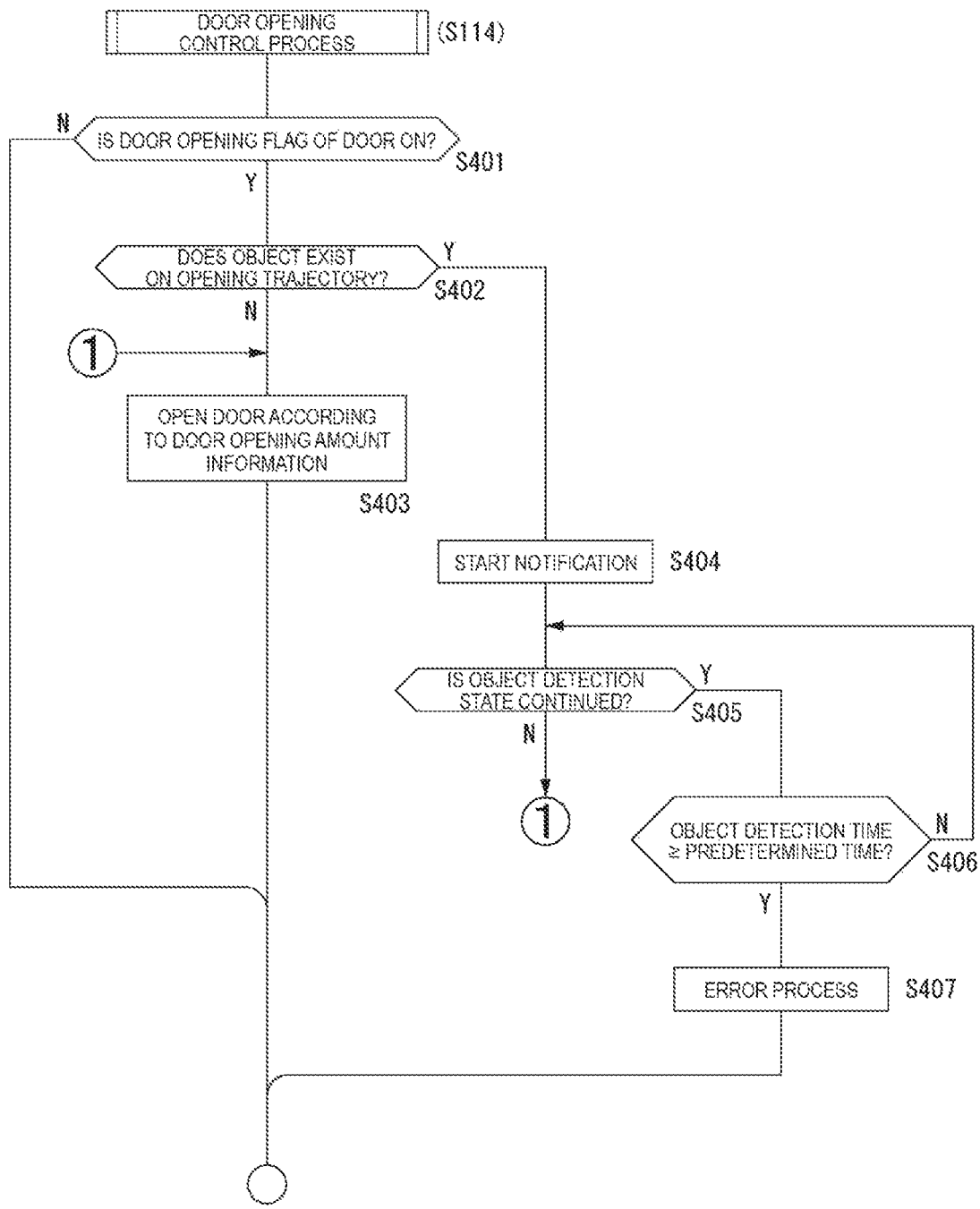
FIG. 8 is a flowchart of a door opening control process illustrated in FIG. 5.

FIG. 8 is a flowchart of the door opening control process of Step S114.

Like the process illustrated in FIG. 7, the process illustrated in FIG. 8 also illustrates a process executed on a single door, and the door controller 9 performs the process illustrated in FIG. 8 for each door in parallel.

In FIG. 8, first, in Step S401, the door controller 9 determines whether the door opening flag of the door is ON. When the door opening flag of the door is not ON, the door controller 9 ends the door opening control process. That is, automatic opening of the door is not executed.

Meanwhile, when the door opening flag of the door is ON, the door controller 9 determines whether an object exists on an opening trajectory of the door in Step S402. The opening trajectory of the door refers to a trajectory of movement of the door when the door is opened. In the present instance, the determination of whether an object exists on the opening trajectory of the door is performed on the basis of a detection signal of a sensor of the door proximity detector 12. The sensor of the door proximity detector 12 of the present instance includes a sensor such as an ultrasonic sensor provided to be capable of detecting whether an object exists on the opening trajectory of the door. On the basis of a detection signal of the sensor, the door controller 9 determines whether an object exists on the door opening trajectory of the door.

The determination of whether an object exists on the door opening trajectory of the door may be performed on the basis of an image captured by a camera provided at each door. Specifically, for instance, a method in which, regarding a captured image obtained by the camera, an image area in which an opening trajectory of the door is located in the image is set as an opening trajectory image area and whether an object detected in the captured image is located in the opening trajectory image area is determined is conceivable.

In a case in which the door opening amount is limited corresponding to the rainy weather as in the present instance, information for rainy weather (information on an opening trajectory corresponding to the limited opening amount) and information for other cases (information on an opening trajectory corresponding to the normal opening amount) can be selectively used as opening trajectory information.

In a case in which it is determined that an object does not exist on the opening trajectory in Step S402, the door controller 9 proceeds to Step S403, executes a process of opening the door according to door opening amount information, and ends the door opening control process. Here, the door opening amount is the door opening amount set regarding the door in the previous Step S108 or S109.

Meanwhile, in a case in which it is determined that an object exists on the opening trajectory in Step S402, the door controller 9 executes a notification start process in Step S404. Here, as the notification, the door controller 9 executes an output of a predetermined notification sound via the speaker of the output unit 11. Further, in the present instance, as the notification, notification is given by causing opening of the door to be driven within the opening amount range in which the door does not come into contact with an object (a detected object on the opening trajectory). Specifically, the door controller 9 calculates a distance to the object that is obtained on the basis of a detection signal of the sensor of the door proximity detector 12, and, on the basis of the distance information, obtains an opening amount of the door in which the door does not come into contact with the object. Then, the door controller 9 gives an instruction for driving opening of the door to the door driver 15 so that the door is opened by the obtained opening amount.

In Step S405 subsequent to Step S404, the door controller 9 determines whether a state in which an object is detected, that is, whether a state in which an object is detected on the opening trajectory, is continued.

When the state in which an object is detected is continued, the door controller 9 proceeds to Step S406, determines whether the time during which the object is detected is a predetermined time or longer, that is, whether a duration time of the state in which the object is detected on the opening trajectory is the predetermined time or longer, and returns to Step S405 when the time during which the object is detected is not the predetermined time or longer. According to the processes in Steps S405 and S406, a loop process waiting for establishment of either condition of a state in which an object is not detected or a state in which the time during which the object is detected is the predetermined time or longer is formed.

In Step S405, when the state in which an object is detected is not continued (that is, when an object is not detected), the door controller 9 proceeds to the above-described Step S403, executes the process of causing the door to be opened according to the door opening amount information, and ends the door opening control process. That is, the door is opened in response to the state in which an object, which has been detected on the opening trajectory, is not detected.

In a case in which the time during which the object is detected is the predetermined time or longer in Step S406, the door controller 9 performs an error process in Step S407, and ends the door opening control process. As the error process, for instance, it is conceivable to cause the output unit 11 to execute an output of notification information to an occupant by sound, light, or the like. Notification in previous Step S404 is positioning such as calling attention that the door is unable to be opened due to obstruction of an object, and notification in Step S407 is positioning such as giving notification that automatic opening of the door is not performed due to an opening error due to an obstacle on the opening trajectory.

In response to execution of the above-described door opening condition establishment determination process (S113) and door opening control process (S114) for each door, the door controller 9 waits until a state in which all occupants have gotten in is reached in Step S115 illustrated in FIG. 5. The process in Step S115 is basically a process in which the door controller 9 waits until at least the current number of seated persons corresponds to the number of occupants during getting off that is specified from the seating information during getting off. In a case in which an occupant is added, it is needless to say that the process in Step S115 is a process in which the door controller 9 waits until the current number of seated persons corresponds to the number of occupants during getting off+the number of added occupants.

In a case in which the state in which all occupants have gotten in is reached, the door controller 9 executes a closing control process for an opened door in Step S116. In the present instance, an occupant is allowed to manually close an automatically opened door. In the closing control process in Step S116, on the basis of a detection signal of the door opening/closing state detector 14, the door controller 9 causes execution of driving of door closing by the door driver 15 on a door in an open state.

In subsequent Step S117, the door controller 9 waits for a starting operation. Here, the starting operation may be any operation assumed to be performed when an occupant (mostly, a driver) causes starting of the vehicle 100. Examples of the starting operation include an operation of releasing a parking brake, an operation of turning on an accelerator, an operation of putting a shift lever in a D range or R range in the case of an automatic transmission (AT) vehicle, an operation of a specific operation button (for instance, a starting instruction button in the case of an automatically driven vehicle), or the like.

In a case in which a starting operation is performed, the door controller 9 clears seating information, that is, seating information during getting off, in Step S118, and ends a series of processes illustrated in FIG. 5. In the clearing process in Step S118, the door controller 9 performs a process of clearing seating information during getting off that is kept in a random access memory (RAM) or the like.

An instance in which detection of seating is performed using a pressure sensor has been described above, but the seating detection can also be performed on the basis of an image captured by a camera which captures an inside of the vehicle.

An instance in which the determination of whether an occupant is in the proximity of a door or whether an object exists on an opening trajectory is performed on the basis of a detection signal of a sensor capable of distance measurement such as an ultrasonic sensor or a laser sensor has been described above, but, for instance, such determination can also be performed on the basis of an image captured by the camera provided at each door.

In the above description, the condition that the state in which the occupant is in the proximity of the door is continued for a predetermined time or longer is set as a condition for opening a door to be opened. However, execution of opening driving of a door to be opened can be caused under the condition that a single portable device carried by a single occupant such as a driver is detected within the range in which communication by the wireless communication unit 16 is possible. At this time, it is desirable to add the establishment of authentication using an ID of a portable device as a condition from a viewpoint of achieving security improvement.

In order to further enhance security, it is conceivable to adopt a configuration in which a portable device is caused to be carried by each occupant and execution of opening driving of the door is caused under the condition that the portable device for which authentication by ID is established approaches the door (for instance, the portable device is detected within a range in which communication is possible).

In the above description, the case in which determination of which of left and right sides the getting-in place is located is performed on the basis of getting-in place information acquired via a network has been exemplified. However, for instance, the left/right determination can also be performed on the basis of a result of recognition of environment outside the vehicle based on an image captured by an in-vehicle camera such as the camera unit 2. For instance, in a case in which the result of the left/right determination is required before arrival at the getting-in place (refer to the execution timing in the door-to-be-opened determination process) as in the process illustrated in FIG. 5, under the assumption that the getting-in place and the getting-off place are the same place, the left/right determination of the getting-in place can be performed in advance on the basis of an image captured immediately before arrival at the getting-off place. Alternatively, for instance, in a case in which the door-to-be-opened determination process (including the re-determination process) is set to be executed after the vehicle 100 arrives at the getting-in place, the left/right determination of the getting-in place can be performed in advance on the basis of an image captured immediately before arrival at the getting-in place.

In the above description, an instance in which the door opening amount is limited in rainy weather (in a case in which there is rainfall on the vehicle 100) has been given. However, in the rainy weather, opening driving can also be performed so that the opening amount of the door gradually increases as the occupant approaches the door. As a result, wetting of the interior portion of the vehicle 100 due to rainfall can be further suppressed.

Regarding an instruction for adding an occupant, along with the instruction, designation of a seat on which an additional occupant sits can also be made possible. In a case in which designation of a seat on which an additional occupant sits is performed, the door controller 9 determines a door defined as the door nearest to the instructed seat as an additional door to be opened.

In the above description, a vehicle having only two rows of seats in a left-right direction as seats has been assumed. However, the present invention can also be suitably applied to a vehicle having seat rows in which the number of seats in the left-right direction is three or more among seat rows arranged in a front-rear direction. Here, regarding seats in the middle of left and right seats in seat rows in which the number of seats in the left-right direction is an odd number of 3 or greater, the door nearest to the seat may be any one of a right side door and a left side door. The present invention can also be suitably applied to a vehicle in which a door used in getting in and off at least a part of seat rows among seat rows arranged in the front-rear direction is formed at only one of the left and right sides. Regarding seat rows having a door provided at only one of the left and right sides as described above, the door nearest to each seat of the seat rows is the door at one side.

<3. Summary of Examples>

As described above, the door control device (vehicle control system 1) of the example is a door control device in a vehicle having a plurality of seats and doors, and includes a door driver (door driver 15) which at least drives opening of a door, a seating position detector (seating detector 13) which detects seating position information indicating a position of a seat on which an occupant is seated, and a door controller (door controller 9) which determines a door to be opened on the basis of the seating position information detected by the seating position detector and causes the door driver to drive opening of the determined door.

As a result, while a door-to-be-opened designating operation by an occupant is made unnecessary, it is possible to automatically open only a necessary door according to a seating position of the occupant.

Therefore, regarding door opening control in a vehicle, it is possible to achieve security improvement from a viewpoint that an unnecessary door is not opened while convenience improvement is achieved by achieving reduction of an operational burden of the occupant. That is, it is possible to achieve both convenience improvement and security improvement.

The door control device of the example further includes a communication unit (wireless communication unit 16) capable of wireless communication with an external device, and the door controller causes execution of driving of opening of a door to be opened under the condition that an external device is detected within a range in which wireless communication by the communication unit is possible.

As a result, it is possible to automatically open a door to be opened under the condition that an occupant approaches a vehicle.

Therefore, further improvement of security can be achieved.

In the door control device of the example, on the basis of the seating position information, the door controller determines a door defined as the door nearest to each seat on which an occupant is seated as a door to be opened.

As a result, it is possible to automatically open an appropriate door that facilitates getting-in of an occupant in a seat on which an occupant is seated.

Therefore, further improvement of convenience can be achieved.

In the door control device of the example, the door controller determines whether there is rainfall on the vehicle, and in a case in which it is determined that there is rainfall, the door controller limits an opening amount of a door to be opened to be smaller than in a case in which it is determined that there is no rainfall.

As a result, it is possible to suppress wetting of an interior portion of a vehicle due to rainfall.

Therefore, further improvement of convenience can be achieved.

In the door control device of the example, the vehicle has a driver's seat, a passenger's seat, and rear seats, which are seats behind the driver's seat and the passenger's seat, as seats and has a driver's seat door provided corresponding to the driver's seat, a passenger's seat door provided corresponding to the passenger's seat, and a pair of left and right rear doors provided corresponding to the rear seats as doors, driving of opening of a door to be opened is performed under the condition that the vehicle is stopped at a predetermined getting-in place, and the door controller determines which of the left and right sides of the vehicle the getting-in place is located and, on the basis of a result of the determination, determines a door to be opened of the rear doors.

As a result, it is possible to automatically open an appropriate door of the rear doors that facilitates getting-in of an occupant according to a position of the getting-in place with respect to the vehicle.

Therefore, further improvement of convenience can be achieved.

In the door control device of the example, the door controller accepts additional occupant information after an occupant gets off, and in a case in which the additional occupant information is received, the door controller determines a door to be opened on the basis of information on the number of added occupants specified from the additional occupant information and the seating position information.

As a result, it is possible to automatically open an appropriate door that facilitates getting-in of an occupant even in a case in which the number of occupants differs from that during getting off.

Therefore, further improvement of convenience can be achieved.

In the door control device of the example, in a case in which there is a door of which an occupant is in the proximity other than a door to be opened, the door controller causes driving of opening of the door under the condition that a state in which the occupant is in the proximity of the door is continued for a predetermined time or longer.

As a result, it is possible to automatically open a door which is presumed as a door through which the occupant can actually easily get in and off.

Therefore, further improvement of convenience can be achieved.

In the door control device of the example, regarding a door determined as a door to be opened, the door controller determines whether an object exists on an opening trajectory of the door, and in a case in which it is determined that an object is present, the door controller causes driving of opening of the door within an opening amount range in which the door does not come into contact with the object.

As a result, while contact between the door and the object is avoided, it is possible to visually inform the occupant of the fact that the door is a door to be opened.

For instance, in the case of notification by sound, there is a possibility that the occupant will miss the notification sound due to ambient noise or the like. However, by using the above-described visual notification, it is possible to cause the occupant to definitely perceive that a door is a door to be opened. Further, upon visual notification, for instance, an additional display device such as an image display device is unnecessary, and cost reduction by reducing the number of parts and weight reduction of the vehicle can be achieved.

The present invention is not limited to the above-described specific instances, and various modified examples are conceivable.

For instance, an instance in which the present invention is applied to a vehicle having an automatic valet parking function has been described above, but the present invention can also be suitably applied to a vehicle which does not have the automatic valet parking function. For instance, in a case in which an occupant approaches a vehicle parked in a parking space and gets in the vehicle, a door to be opened is determined on the basis of seating position information during getting off.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A door control device in a vehicle comprising seats and doors, the door control device comprising:
a door driver configured to at least drive opening of the doors;
a seating position detector configured to detect seating position information indicating a position of a seat of the seats on which an occupant is seated during the vehicle stopping at a getting-off place; and
a door controller configured to:
determine, after the occupant gets off the vehicle at the getting-off place, a first door of the doors to be opened for the occupant to get in the vehicle at a getting-in place, wherein
the first door to be opened at the getting-in place is determined on a basis of the seating position information indicating the position of the seat on which the occupant is seated during the vehicle stopping at the getting-off place; and
cause the door driver to drive opening of the determined first door at the getting-in place.

2. The door control device according to claim 1, further comprising a communication unit capable of wireless communication with an external device,
wherein the door controller is further configured to cause the door driver to drive the opening of the determined first door at the getting-in place under a condition that the external device is detected within a range in which the wireless communication by the communication unit is possible.

3. The door control device according to claim 1, wherein, on the basis of the seating position information, the door controller is further configured to determine a specific door of the doors that is nearest to the seat on which the occupant is seated as the determined first door.

4. The door control device according to claim 2, wherein, on the basis of the seating position information, the door controller is further configured to determine a specific door of the doors that is nearest to the seat on which the occupant is seated as the determined first door.

5. The door control device according to claim 1, wherein the door controller is further configured to:
determine whether there is rainfall on the vehicle; and
in a case in which it is determined that there is rainfall, limit an opening amount of the determined first door to be smaller than in a case in which it is determined that there is no rainfall.

6. The door control device according to claim 2, wherein the door controller is further configured to:
determine whether there is rainfall on the vehicle; and
in a case in which it is determined that there is rainfall, limit an opening amount of the determined first door to be smaller than in a case in which it is determined that there is no rainfall.

7. The door control device according to claim 1, wherein the seats of the vehicle comprise a driver's seat, a passenger's seat, and rear seats,
the rear seats are behind the driver's seat and the passenger's seat,
the doors of the vehicle comprise a driver's seat door provided corresponding to the driver's seat, a passenger's seat door provided corresponding to the passenger's seat, and a pair of left and right rear doors provided corresponding to the rear seats, and
the door controller is further configured to:
determine a location of a predetermined getting-in place, wherein the predetermined getting-in place is located at one of a left side of the vehicle or a right side of the vehicle;
determine the first door of the pair of left and right rear doors to be opened on a basis of the determination of the location of the predetermined getting-in place; and
cause the door driver to drive the opening of the determined first door under a condition that the vehicle is stopped at the predetermined getting-in place.

8. The door control device according to claim 2, wherein the seats of the vehicle comprise a driver's seat, a passenger's seat, and rear seats,
the rear seats are behind the driver's seat and the passenger's seat,
the doors of the vehicle comprise a driver's seat door provided corresponding to the driver's seat, a passenger's seat door provided corresponding to the passenger's seat, and a pair of left and right rear doors provided corresponding to the rear seats, and
the door controller is further configured to:
determine a location of a predetermined getting-in place, wherein the predetermined getting-in place is located at one of a left side of the vehicle or a right side of the vehicle;
determine the first door of the pair of left and right rear doors to be opened on a basis of the determination of the location of the predetermined getting-in place; and
cause the door driver to drive the opening of the determined first door under a condition that the vehicle is stopped at the predetermined getting-in place.

9. The door control device according to claim 1, wherein the door controller is further configured to:
receive additional occupant information after the occupant gets off the vehicle; and
in a case in which the additional occupant information is received, determine the first door to be opened at the getting-in place on a basis of information on a number of additional occupants specified from the additional occupant information and the seating position information.

10. The door control device according to claim 2, wherein the door controller is further configured to:
receive additional occupant information after the occupant gets off the vehicle; and
in a case in which the additional occupant information is received, determine the first door to be opened at the getting-in place on a basis of information on a number of additional occupants specified from the additional occupant information and the seating position information.

11. The door control device according to claim 1, wherein, in a case in which there is a second door of the doors of which the occupant is in proximity other than the determined first door, the door controller is further configured to cause the door driver to drive opening of the second door under a condition that a state in which the occupant is in the proximity of the second door has continued for a predetermined time or longer.

12. The door control device according to claim 2, wherein, in a case in which there is a second door of the doors of which the occupant is in proximity other than the determined first door, the door controller is further configured to cause the door driver to drive opening of the second door under a condition that a state in which the occupant is in the proximity of the second door has continued for a predetermined time or longer.

13. The door control device according to claim 1, wherein, regarding the determined first door, the door controller is further configured to:
   determine whether an object exists on an opening trajectory of the determined first door; and
   in a case in which it is determined that the object is present, cause the door driver to drive the opening of the determined first door within an opening amount range in which the determined first door does not come into contact with the object.

14. The door control device according to claim 2, wherein, regarding the determined first door, the door controller is further configured to:
   determine whether an object exists on an opening trajectory of the determined first door; and
   in a case in which it is determined that the object is present, cause the door driver to drive the opening of the determined first door within an opening amount range in which the determined first door does not come into contact with the object.

15. A door control device in a vehicle comprising seats and doors, the door control device comprising:
   a door driver configured to at least drive opening of the doors;
   a seating position detector configured to detect seating position information indicating a position of a seat of the seats on which an occupant is seated during the vehicle stopping at a getting-off place; and
   circuitry configured to:
      determine, after the occupant gets off the vehicle at the getting-off place, a door of the doors to be opened for the occupant to get in the vehicle at a getting-in place, wherein
         the door to be opened at the getting-in place is determined on a basis of the seating position information indicating the position of the seat on which the occupant is seated during the vehicle stopping at the getting-off place; and
      cause the door driver to drive opening of the determined door at the getting-in place.

16. A door control device in a vehicle comprising seats and doors, the door control device comprising:
   a door driver configured to at least drive opening of the doors;
   a seating position detector configured to detect seating position information indicating a position of a seat of the seats on which an occupant is seated, wherein
      the seats of the vehicle comprise a driver's seat, a passenger's seat, and rear seats,
      the rear seats are behind the driver's seat and the passenger's seat, and
      the doors of the vehicle comprise a driver's seat door provided corresponding to the driver's seat, a passenger's seat door provided corresponding to the passenger's seat, and a pair of left and right rear doors provided corresponding to the rear seats; and
   a door controller configured to:
      determine a location of a predetermined getting-in place, wherein the predetermined getting-in place is located at one of a left side of the vehicle or a right side of the vehicle;
      determine a door of the pair of left and right rear doors to be opened on a basis of the seating position information and the determination of the location of the predetermined getting-in place; and
      cause the door driver to drive opening of the determined door under a condition that the vehicle is stopped at the predetermined getting-in place.

17. The door control device according to claim 1, wherein
   the first door to be opened at the getting-in place is determined after an unmanned movement condition of the vehicle is established, and
   the door controller is further configured to cause, after the vehicle moves in an automatic operation from the getting-off place to the getting-in place, the door driver to drive the opening of the determined first door at the getting-in place.

18. The door control device according to claim 1, wherein after the vehicle moves in an automatic operation from the getting-off place to the getting-in place through a parking space, the door controller is further configured to cause the door driver to drive the opening of the determined first door at the getting-in place.

19. The door control device according to claim 15, wherein
   the door to be opened at the getting-in place is determined after an unmanned movement condition of the vehicle is established, and
   the circuitry is further configured to cause, after the vehicle moves in an automatic operation from the getting-off place to the getting-in place, the door driver to drive the opening of the determined door at the getting-in place.

20. The door control device according to claim 15, wherein after the vehicle moves in an automatic operation from the getting-off place to the getting-in place through a parking space, the circuitry is further configured to cause the door driver to drive the opening of the determined door at the getting-in place.

* * * * *